United States Patent Office 2,904,394
Patented Sept. 15, 1959

2,904,394

PREPARATION OF URANIUM FLUORIDES

William Channing Smith, Wilmington, Del., assignor to E. I. du Pont de Nemours and Company, Wilmington, Del., a corporation of Delaware No Drawing. Application June 7, 1957
Serial No. 664,166

10 Claims. (Cl. 23—14.5)

This invention relates to uranium fluorides and has as its primary object provision of a new process for synthesizing the same, uranium hexafluoride in particular.

Uranium hexafluoride is a well-known chemical used as an intermediate in processes for separation of the isotopes of uranium. It can also act as a mild fluorinating agent or form complex salts with alkali fluorides. It has been prepared by the action of elemental fluorine on uranium metal, uranium carbide and uranium pentachloride. It has also been prepared by the action of hydrogen fluoride on uranium pentachloride. These processes either require unusual materials of construction to handle the highly corrosive reactants or are generally not applicable directly to the oxides of uranium as found in ores.

It has now been found that hexavalent uranium fluorides can be prepared by contacting sulfur tetrafluoride at a temperature sufficient to effect reaction with an inorganic compound containing hexavalent uranium and oxygen in which uranium is bonded directly to oxygen. In one embodiment of the invention uranium oxides are used in which each uranium atom is bonded to at least three oxygen atoms. The uranium oxides can be used in pure form or in mixtures with oxides of other metals as they occur in nature. Examples of compounds which illustrate this embodiment of the invention are uranium trioxide ($UO_3$), pitch-blende (principally $U_3O_8$), curite, rauvite, dewindite, kasolite and other solid solutions which contain uranium trioxide. Binary oxides containing hexavalent uranium form a preferred group of compounds for use in the process of this invention.

In a second embodiment of the invention, compounds that are derivatives of uranic acid ($H_2UO_4$) can be employed. Uranates, in which uranium is bonded to four oxygen atoms, and uranyl derivatives, in which uranium is bonded to two oxygen atoms, are also operable. Examples of such compounds are potassium uranate, sodium pyrouranate, uranyl chloride, uranyl nitrate and salts of uranyl carbonate with alkali metal carbonates. The uranyl halides form a preferred group of compounds for use in the process of this invention.

The examples given above illustrate the broad range of compounds that are operable in the process and which have as a common component hexavalent uranium bonded to oxygen.

Compositions which contain tetravalent uranium bonded to oxygen will yield uranium tetrafluoride by the process of the invention. This compound can be oxidized by suitable processes to a hexavalent uranyl compound, for example, uranyl fluoride ($UO_2F_2$), which will then yield uranium hexafluoride by the process of the invention.

Sulfur tetrafluoride, which is used as the fluorinating agent, can be prepared by methods described in the literature (Brown and Robinson, J. Chem. Soc. 1955, 3147–51).

The uranium-containing compositions are preferably used in anhydrous form and free of water of crystallization, since water reacts with sulfur tetrafluoride and with uranium hexafluoride. The uranium reactant, if solid, is preferably used in a comminuted form to obtain a maximum yield of uranium hexafluoride.

The reaction of the uranium compound with sulfur tetrafluoride is conducted under substantially anhydrous conditions in either a batch or continuous flow process. In either process the reaction chamber is preferably made of material resistant to chemical attack by hydrogen fluoride, for example, stainless steel or platinum. In a batch process a vessel capable of withstanding pressure is preferably flushed with an inert gas, for example, nitrogen to displace the air and is then charged with the uranium compound. The chamber is cooled, evacuated to less than 50 mm. pressure and sulfur tetrafluoride then added to the cooled chamber.

The proportions in which the reactants are used are not critical although, to obtain maximum yields of uranium hexafluoride, the sulfur tetrafluoride is preferably used in excess. The molar ratio of sulfur tetrafluoride to the uranium-containing composition will be determined in part by the number of oxygen atoms present in the composition. Generally, at least one-half mole of sulfur tetrafluoride is used for each atom of oxygen to be replaced. The quantity of sulfur tetrafluoride can, however, range from 0.1 mole to 20 moles for each atom of oxygen present in the uranium-containing composition.

The temperature of the reaction is kept as low as operability permits and preferably lies between about 20° C. and about 500° C. However, both higher and lower temperatures can be used. The pressure employed is generally autogenous and can, in a batch process, lie between about 5 atmospheres and 50 atmospheres. The reaction time for a batch process will vary with the type of uranium compound used as a reactant and may range from 5 minutes or less to 48 hours or more. During the reaction period the contents of the reaction vessel are preferably mixed, for example, by mechanical stirring or shaking.

The process of the invention can also be conducted by a continuous flow method wherein the uranium reactant is placed in a tube of corrosion-resistant material. The tube and contents are preferably heated to insure complete removal of moisture and then cooled. Sulfur tetrafluoride gas is then passed through the tube which is heated to a temperature sufficient to cause reaction of the uranium compound with the sulfur tetrafluoride gas. Volatile products are collected in traps cooled with, for example, solid carbon dioxide-acetone solution or liquid nitrogen. In a continuous flow process the time of contact between the reactants may be as short as a few seconds.

The uranium hexafluoride obtained in the process may be isolated as solid $UF_6$ which can be purified by known methods, for example, by sublimation, or it may be obtained in the form of complex salts with alkali metal fluorides.

Advantages of this invention will be evident from the foregoing discussion. Thus there is provided a relatively cheap, simple method of preparing uranium fluorides, the hexafluoride in particular. In addition, the process is readily adapted to the recovery of uranium in the form of the hexafluoride from its oxidic ores. The ore, e.g., pitch-blende, curite, or the like, need merely be crushed or otherwise comminuted and sulfur tetrafluoride reacted therewith. The volatile hexafluoride can be separated from the resultant mass by conventional methods.

The following examples illustrate the operation of the process.

Example 1

A borosilicate glass reaction tube, about 12 inches long and having an inner diameter of 1 inch and fitted with a thermocouple well was charged with 14.3 g. (0.05 mole) of uranium trioxide ($UO_3$). The uranium trioxide was distributed evenly as a layer on the bottom of the tube. The reactor was flushed with helium and a trap cooled in solid carbon dioxide-acetone solution was attached to the exit end. Sulfur tetrafluoride gas was passed over the oxide at 30–55° C. for 4 minutes, 280–323° C. for 6.5 minutes, 345–365° C. for 3 minutes and 440–460° C. for 5 minutes. Volatile reaction products were formed above 280° C. and were collected in the trap. A total of 52 g. of sulfur tetrafluoride was passed over the oxide.

The trap containing the liquid and solid reaction products was allowed to warm slowly to room temperature. A solid product remained which was sublimed under vacuum into a cylinder cooled in liquid nitrogen. The weight of sublimed solid uranium hexafluoride was 5 g.; it fumed vigorously on exposure to the atmosphere. The uranium hexafluoride was dissolved in water with the evolution of heat and a solid subsequently precipitated. The aqueous solution was separated by filtration and positive tests for uranium and fluorine were obtained on treating portions of this solution with aqueous potassium ferrocyanide and saturated aqueous calcium chloride solutions, respectively.

Example 2

The apparatus and procedure used in this experiment were similar to those described in Example 1 except that a controlled heating circuit was employed to insure a lower temperature limit of 400° C. The tube was charged with 28.6 g. (0.10 mole) of uranium trioxide ($UO_3$) which was then heated to 400° C. for one hour in a helium gas atmosphere. A total of 71 g. (about 0.65 mole) of sulfur tetrafluoride was then passed through the tube in a period of 30 minutes while maintaining the temperature at 400–435° C. The solid product which collected in the trap was warmed to air temperature and transferred under a blanket of helium gas to a polytetrafluoroethylene bottle. The yield of uranium hexafluoride, based on analysis of the solid product was 71%; M.P. of purified uranium hexafluoride, 67–70° C. (sealed tube).

Example 3

A pressure vessel of 145 ml. capacity and lined with stainless steel was charged with 28.6 g. (0.10 mole) of uranium trioxide ($UO_3$) and 66 g. (0.60 mole) of sulfur tetrafluoride. It was heated with agitation at 100° C. for 2 hours, 150° C. for 2 hours and at 200° C. for 10 hours. There was obtained a colorless, moisture-sensitive solid which weighed 16.3 g. A portion of this solid was sublimed to yield pure uranium hexafluoride.

Example 4

The apparatus and procedure were similar to those employed in Example 2. The reaction tube was charged with 28.1 g. (0.033 mole) of uranium oxide ($U_3O_8$) which was then heated at 300° C. for 1 hour in an atmosphere of helium. A total of 40 g. (0.37 mole) of sulfur tetrafluoride was passed through the tube which was heated at 300–360° C. for 7 minutes and 400–435° C. for 11 minutes. The contents of the trap was warmed to air temperature (approximately 25° C.) and then transferred by sublimation to a strainless steel cylinder. The product, uranium hexafluoride, weighed 19 g. There was also obtained as a residue in the reactor 13 g. of a greenish solid that was shown by X-ray diffraction to be uranium tetrafluoride. The uranium oxide ($U_3O_8$) therefore yields both the tetra- and hexafluorides of uranium.

Examples 1 through 4 illustrate the application of the process to compounds which contain only oxygen and uranium and in which there is present hexavalent uranium.

Example 5

Uranyl fluoride ($UO_2F_2$) was prepared by the process described by Katz and Rabinowitch, "The Chemistry of Uranium," vol. VIII–5, page 565, Nuclear Energy Series (McGraw-Hill, 1951). The apparatus and procedure for the reaction with sulfur tetrafluoride were similar to that described in Example 2. The reactor was charged with 21.6 g. (0.070 mole) of uranyl fluoride and 58 g. (0.53 mole) of sulfur tetrafluoride passed through at 400–425° C. over a period of 35.5 minutes. There was obtained in the trap 12.6 g. of colorless, crystalline uranium hexafluoride; yield, 83%. The identity of this product as uranium hexafluoride was confirmed by infrared analysis.

The above example illustrates the process as applied to a uranyl compound which contains hexavalent uranium bonded to oxygen and a halogen. Another uranyl compound which can be used is uranyl bromide.

Example 6

The apparatus and procedure were similar to those described in Example 2. The tube was charged with 23.2 g. (0.067 mole) of sodium uranate ($Na_2UO_4$) which was then dried by heating to 400° C. in a stream of helium gas for 45 minutes. Sulfur tetrafluoride gas was passed over the sodium uranate at 400° C. The temperature rose temporarily to 460° C. and was maintained between 400° and 460° C. for the duration of the reaction (15 minutes). The volatile reaction products were collected in a trap cooled in solid carbon dioxide-acetone solution; the trap was allowed to warm to air temperature (about 25° C.) There was obtained 3.8 g. of a solid product which, when sublimed, yielded uranium hexafluoride.

Example 6 illustrates the application of the process to a salt of uranic acid. Other compounds which can be used are potassium uranate and calcium uranate.

In the operation of the process of the invention thionyl fluoride ($SOF_2$) can be formed as a by-product. The thionyl fluoride can be reacted with uranium oxides to obtain partially fluorinated uranium compounds, for example, uranium tetrafluoride (from $UO_2$) and uranium oxyfluorides. The reaction with thionyl fluoride does not lead directly to uranium hexafluoride. The partially fluorinated uranium compounds obtained by reaction with thionyl fluoride can, however, be converted to uranium hexafluoride by reaction with sulfur tetrafluoride, using, if necessary, an intermediate oxidation step to convert any tetravalent uranium fluoride to a hexavalent uranium oxyfluoride.

Since many variations therein, particularly in the compound fluorinated, will be evident to those skilled in the chemical arts, I propose to be bound solely by the appended claims.

The embodiments of the invention in which an exclusive property or privilege is claimed are defined as follows:

1. The process of synthesizing a uranium fluoride which comprises reacting sulfur tetrafluoride with an inorganic uranium compound containing hexavalent uranium bonded to oxygen under substantially anhydrous conditions.

2. The process of claim 1 in which the inorganic uranium compound is an oxide.

3. The process of claim 1 in which the inorganic uranium compound is a salt of uranic acid.

4. The process of claim 1 in which the inorganic uranium compound is a uranyl compound.

5. The process of claim 4 in which the uranyl compound is a halide of the group consisting of fluoride, chloride, and bromide.

6. The process of synthesizing uranium hexafluoride which comprises reacting sulfur tetrafluoride with an oxide of uranium containing hexavalent uranium under substantially anhydrous conditions.

7. The process of synthesizing uranium hexafluoride which comprises reacting sulfur tetrafluoride with uranium trioxide under substantially anhydrous conditions.

8. The process of synthesizing uranium hexafluoride which comprises reacting sulfur tetrafluoride with the uranium oxide $U_3O_8$ under substantially anhydrous conditions.

9. The process of synthesizing uranium hexafluoride which comprises reacting sulfur tetrafluoride with uranyl fluoride under substantially anhydrous conditions.

10. The process of synthesizing uranium hexafluoride which comprises reacting sulfur tetrafluoride with an alkali metal uranate under substantially anhydrous conditions.

References Cited in the file of this patent

UNITED STATES PATENTS

| | | |
|---|---|---|
| 2,270,445 | Jenness | Jan. 20, 1942 |
| 2,469,916 | Carter | May 10, 1949 |